United States Patent
Sato et al.

(10) Patent No.: US 11,541,552 B2
(45) Date of Patent: Jan. 3, 2023

(54) CONTROL DEVICE CONTROLLING ROBOT AND ROBOT SYSTEM

(71) Applicant: Seiko Epson Corporation, Tokyo (JP)

(72) Inventors: Yuki Sato, Sakata (JP); Yoshito Miyamoto, Matsumoto (JP); Yukihiro Yamaguchi, Matsumoto (JP); Katsuji Igarashi, Chino (JP)

(73) Assignee: SEIKO EPSON CORPORATION

( * ) Notice: Subject to any disclaimer, the term of this patent is extended or adjusted under 35 U.S.C. 154(b) by 650 days.

(21) Appl. No.: 16/585,076

(22) Filed: Sep. 27, 2019

(65) Prior Publication Data

US 2020/0101621 A1 Apr. 2, 2020

(30) Foreign Application Priority Data

Sep. 28, 2018 (JP) .............................. JP2018-183238

(51) Int. Cl.
*B25J 13/08* (2006.01)
*B25J 19/02* (2006.01)
(Continued)

(52) U.S. Cl.
CPC ........... *B25J 13/086* (2013.01); *B25J 19/022* (2013.01); *G01S 17/08* (2013.01); *G05D 3/12* (2013.01)

(58) Field of Classification Search
CPC ... G05B 19/0426; B25J 19/022; B25J 9/1674; B25J 13/086; G01S 17/08; G01S 17/88; G05D 3/12
(Continued)

(56) References Cited

U.S. PATENT DOCUMENTS 8,463,433 B2 * 6/2013 Nagasaka .............. B25J 13/084
700/263
2015/0105908 A1 * 4/2015 Ivanov ................... B25J 9/1697
901/47
(Continued)

FOREIGN PATENT DOCUMENTS

CN 106269624 A * 1/2017 ............. B08B 1/002
EP 3357650 A2 * 8/2018 ............. B25J 9/161
(Continued)

*Primary Examiner* — Atul Trivedi
(74) *Attorney, Agent, or Firm* — Harness, Dickey & Pierce, P.L.C.

(57) ABSTRACT

Provided is a control device controlling a robot having a movable section to which a work section, performing work on a target object, is attached and which moves the work section. The control device includes a control section receiving an output from a distance measurement section measuring a distance between the target object and the work section and controlling the movable section in accordance with a plurality of settings including a first section and a second section and a reception section selectively receiving (a) the first setting in which, when the work section is being moved by the movable section based on an output from the distance measurement section, the control section stops moving the work section when the distance or a rate of a change of the distance falls outside a preset reference range and (b) the second setting in which, when the work section is being moved based on the output from the distance measurement section, the control device continues to move the work section not based on the output from the distance measurement section when the distance or the rate of change falls outside the reference range.

14 Claims, 13 Drawing Sheets

(51) Int. Cl.
*G05D 3/12* (2006.01)
*G01S 17/08* (2006.01)

(58) Field of Classification Search
USPC .......................................................... 700/245
See application file for complete search history.

(56) References Cited

U.S. PATENT DOCUMENTS

| | | | | |
|---|---|---|---|---|
| 2015/0133961 A1* | 5/2015 | Uchida | .............. | A61B 17/3203 606/130 |
| 2016/0059412 A1* | 3/2016 | Oleynik | .............. | B62D 57/032 700/250 |
| 2017/0014998 A1* | 1/2017 | Langenfeld | ............ | A61B 34/73 |
| 2018/0056521 A1* | 3/2018 | Miyamoto | .............. | B25J 11/00 |
| 2018/0071911 A1* | 3/2018 | Miyamoto | .............. | B25J 9/1687 |
| 2018/0071949 A1* | 3/2018 | Giles | .................... | E04G 21/0463 |
| 2018/0085559 A1* | 3/2018 | Laby | .................... | A61B 17/122 |
| 2018/0085920 A1* | 3/2018 | Yamada | ................. | B25J 9/1635 |
| 2018/0092757 A1* | 4/2018 | Behzadi | ................ | A61F 2/4612 |
| 2018/0116741 A1* | 5/2018 | Garcia Kilroy | .... | A61B 17/3423 |
| 2018/0129184 A1* | 5/2018 | Shimodaira | ............. | B25J 9/1694 |
| 2018/0162013 A1* | 6/2018 | Fulop | .................... | C09D 129/04 |
| 2018/0194009 A1* | 7/2018 | Kojima | ................ | B25J 15/0019 |
| 2018/0201029 A1* | 7/2018 | Mathis | ....................... | B41J 2/01 |
| 2020/0289205 A1* | 9/2020 | Scheib | ............... | A61B 1/00097 |
| 2020/0367977 A1* | 11/2020 | Liu | ....................... | B25J 9/1676 |
| 2022/0110701 A1* | 4/2022 | Crawford | .............. | A61B 90/14 |
| 2022/0265501 A1* | 8/2022 | Elia | ....................... | A61G 13/129 |

FOREIGN PATENT DOCUMENTS

| | | | | |
|---|---|---|---|---|
| JP | 2003-019451 A | | 1/2003 | |
| KR | 101832413 B1 * | | 2/2018 | ............ B29C 45/78 |
| KR | 20210072703 A * | | 6/2021 | .......... A47L 11/4011 |
| TW | 202222518 A * | | 6/2022 | |
| WO | WO-2017103682 A2 * | | 6/2017 | ............ A47B 77/08 |
| WO | WO-2018063100 A2 * | | 4/2018 | .......... B25J 11/0055 |
| WO | WO-2018092243 A1 * | | 5/2018 | .............. B25J 13/08 |
| WO | WO-2020061711 A1 * | | 4/2020 | ............ B25J 11/008 |
| WO | WO-2020236193 A1 * | | 11/2020 | ............ A61B 34/30 |
| WO | WO-2021078345 A1 * | | 4/2021 | ............ B25J 9/0081 |

\* cited by examiner

CONTROL DEVICE CONTROLLING ROBOT AND ROBOT SYSTEM

The present application is based on, and claims priority from, JP Application Serial Number 2018-183238, filed Sep. 28, 2018, the disclosure of which is hereby incorporated by reference herein in its entirety.

BACKGROUND

1. Technical Field

The present disclosure relates to a control device controlling a robot and a robot system.

2. Related Art

In the related art, a technology for applying a liquid material such as a coating material to a predetermined part is available. In the technology of JP-A-2003-19451, data from a distance sensor located in the moving direction of the coating robot and other distance sensors is taken into a controlling controller and when even one distance measured by one or more distance sensors among three distance sensors located in a portion not in the moving direction exceeds a tolerable range, a position and an inclination of a coating head are returned to normal. As a result, a coating is performed while the distance between a surface of an object to be coated and a coating nozzle and the position and inclination of the coating head are corrected. The distance sensor can measure distance to a target object and output distance data only for a certain position range.

However, according to the technology of JP-A-2003-19451, when irregularities having a sharp inclination are present in an area to be processed, the coating nozzle cannot follow a surface shape of a target object, so that there is a concern that data from the distance sensor is not obtained, that a rate of change of the distance falls outside a preset reference range, that the coating work is frequently stopped, and that the processing cannot be efficiently performed.

SUMMARY

According to an aspect of the present disclosure, there is provided a control device controlling a robot having a movable section moving a work section performing a work on a target. The control device includes a control section controlling the movable section to which the work section is attached and a reception section receiving a first setting or a second setting, in which, when the reception section receives the first setting and the work section is being moved by the movable sections based on an output from a distance measurement section measuring a distance between the target object and the work section, the control section stops moving the work section when the distance or a rate of a change of the distance measured by the distance measurement section falls outside a preset reference range and, when the reception section receives the second setting and the work section is being moved by the movable section based on the output from the distance measurement section, the control section moves the work section not based on the output from the distance measurement section when the distance or the rate of change falls outside the reference range.

DESCRIPTION OF EXEMPLARY EMBODIMENTS

A. First Embodiment

1. Configuration of Robot System

Figure 1:
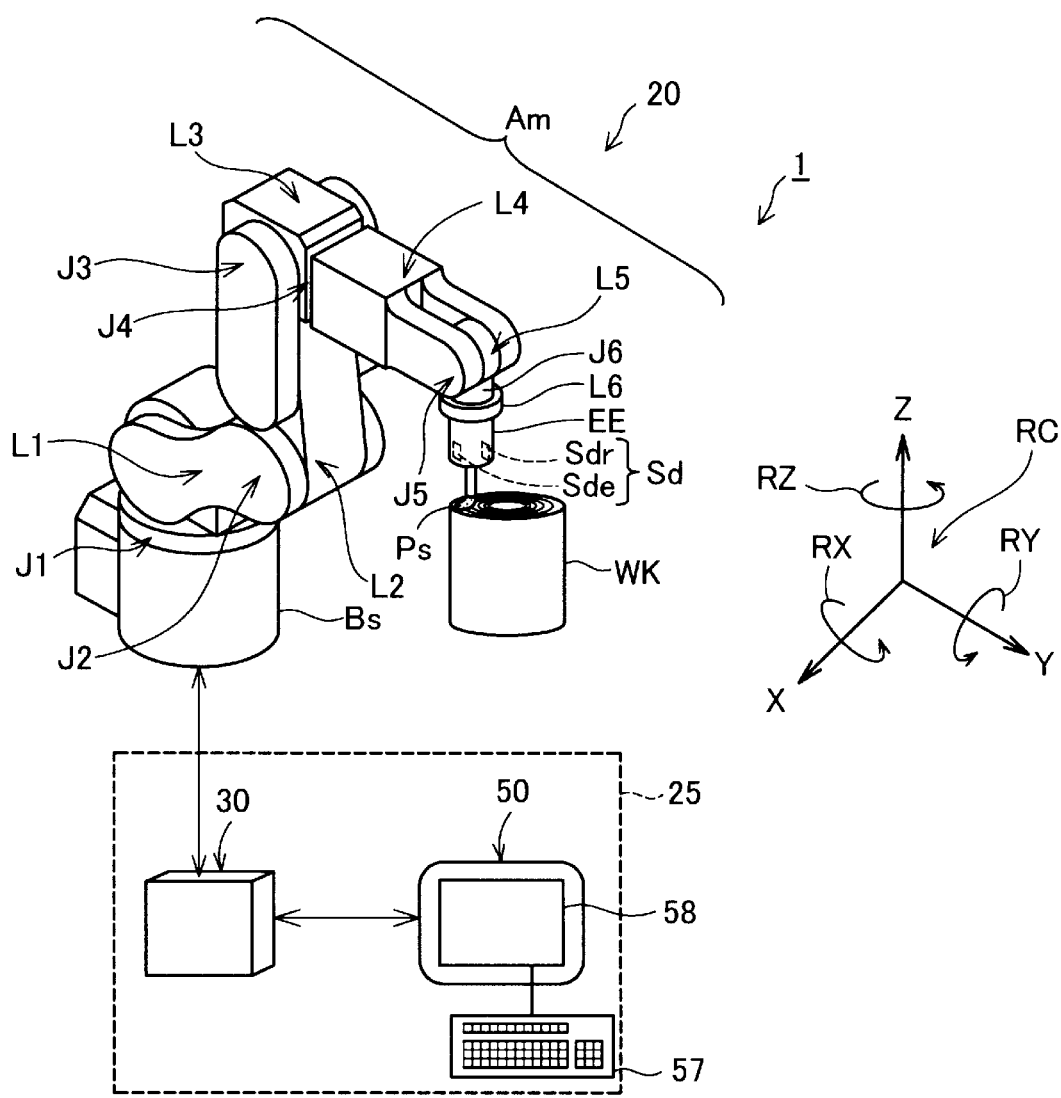
FIG. 1 is a view showing a hardware configuration of a robot system according to a present embodiment.

FIG. 1 is a view showing a hardware configuration of a robot system 1 according to a present embodiment. The robot system 1 performs a predetermined work on a work WK. More specifically, the robot system 1 applies an adhesive to an upper end surface of the work WK.

The robot system 1 includes a robot 20 and a robot control device 25. The robot control device 25 controls the robot 20. The robot control device 25 is configured with a motion control device 30 and a teaching device 50.

The robot 20 is a single-arm robot including an arm Am and a support base Bs supporting the arm Am. The arm Am is a six-axis vertical articulated arm. The arm Am includes links L1 to L6 which are six arm members and six joints J1 to J6. A joint J2, a joint J3, and a joint J5 are bending joints and a joint J1, a joint J4, and a joint J6 are torsion joints.

The support base Bs and the link L1 are coupled through the joint J1. The link L1 and the link L2 are coupled through the joint J2. The link L2 and the link L3 are coupled through the joint J3. The link L3 and the link L4 are coupled through the joint J4. The link L4 and the link L5 are coupled through the joint J5. The link L5, the link L6, and an end effector EE are coupled through the joint J6. The end effector EE is attached to a tip end of the arm Am. The arm Am and the end effector EE are communicably coupled to the motion control device 30 of the robot control device 25 by a cable.

The arm Am can move the end effector EE in a three-dimensional space. A position of the end effector EE is defined by a tool center point (TCP). In the present embodiment, the TCP is on a rotation shaft of the joint J6. The motion control device 30 controls a position of the TCP as a control point in a robot coordinate system RC by driving the arm Am.

In the present embodiment, a coordinate system defining a space in which the robot 20 is installed with the position of the support base Bs as a reference is referred to as the robot coordinate system RC. The robot coordinate system RC is a three-dimensional orthogonal coordinate system defined by X-axis and Y-axis orthogonal to each other on a horizontal plane and Z-axis with a vertically upward direction as a positive direction. In the present specification, when simply referred to as "X-axis", it represents the X-axis in the robot coordinate system RC. When simply referred to as "Y-axis", it represents the Y-axis in the robot coordinate system RC. When simply referred to as "Z-axis", it represents the Z-axis in the robot coordinate system RC. Any position in the robot coordinate system RC can be specified by a position DX in the X-axis direction, a position DY in the Y-axis direction, and a position DZ in the Z-axis direction.

In the present embodiment, a rotation position around the X-axis is represented by an angular position RX. A rotation position around the Y-axis is represented by an angular position RY. A rotation position around the Z-axis is represented by an angular position RZ. Any posture in the robot coordinate system RC can be expressed by the angular position RX around the X-axis, the angular position RY around the Y-axis, and the angular position RZ around the Z-axis.

In the present specification, when referred to as a "position", it also means a posture in addition to a narrowly defined position. When referred to as a "force", it also means torque acting in the rotation direction around the X-axis, Y-axis, and Z-axis in addition to a force in a narrow sense defined by an orientation and a magnitude in a three-dimensional space.

The end effector EE functions as a work section performing work on the work WK. More specifically, the end effector EE is a dispenser ejecting a fluid Ps to be adhered to the work WK. The fluid Ps is an adhesive. An inner diameter of a nozzle of the dispenser is 0.33 mm in the present embodiment. The end effector EE is moved by the arm Am of the robot 20 with respect to the work WK.

In the present embodiment, a coordinate system defining a space with the TCP as a control point as a reference is represented as a hand coordinate system HC. The hand coordinate system HC is a three-dimensional orthogonal coordinate system defined by the Z-axis extending in a direction opposite to the link L6 of the arm Am with respect to the end effector EE in the rotation axis direction of the joint J6, the X-axis orthogonal to the Z-axis, and the Y-axis orthogonal to the Z-axis and the X-axis, with the TCP as an origin.

A distance measurement section Sd is provided in the end effector EE. The distance measurement section Sd can measure the distance between a target object located at a distance from the end effector EE in the positive direction of the Z-axis of the hand coordinate system HC from the TCP and the distance measurement section Sd. The measurement distance section Sd is fixed to the link L6 of the tip end of the arm Am and the end effector EE. Therefore, it is possible to measure the distance between the target object and the end effector EE based on the output of the distance measurement section Sd. The distance measurement section Sd transmits an output indicating the distance between the target object and the end effector EE to the motion control device 30. The motion control device 30 receives an output from the distance measurement section Sd, controls a motion of the arm Am, and, as a result, controls the position of the end effector EE attached to the tip end of the arm Am.

Specifically, the distance measurement section Sd is a laser displacement meter. The distance measurement section Sd includes semiconductor laser Sde and a light receiving element Sdr. The semiconductor laser Sde emits a laser beam. The distance measurement section Sd measures the distance to a target object by receiving reflected light of the laser beam by the target object with the light receiving element Sdr.

The distance measurement section Sd can measure the distance from the distance measurement section Sd to a target object only for the target object within a range of a certain distance from the distance measurement section Sd.

The work WK is a cylindrical object formed by rounding of a rectangular sheet. The robot 20 applies the fluid Ps as an ejection material to an upper surface of the work WK in which the end of the sheet is spirally disposed.

Figure 2:
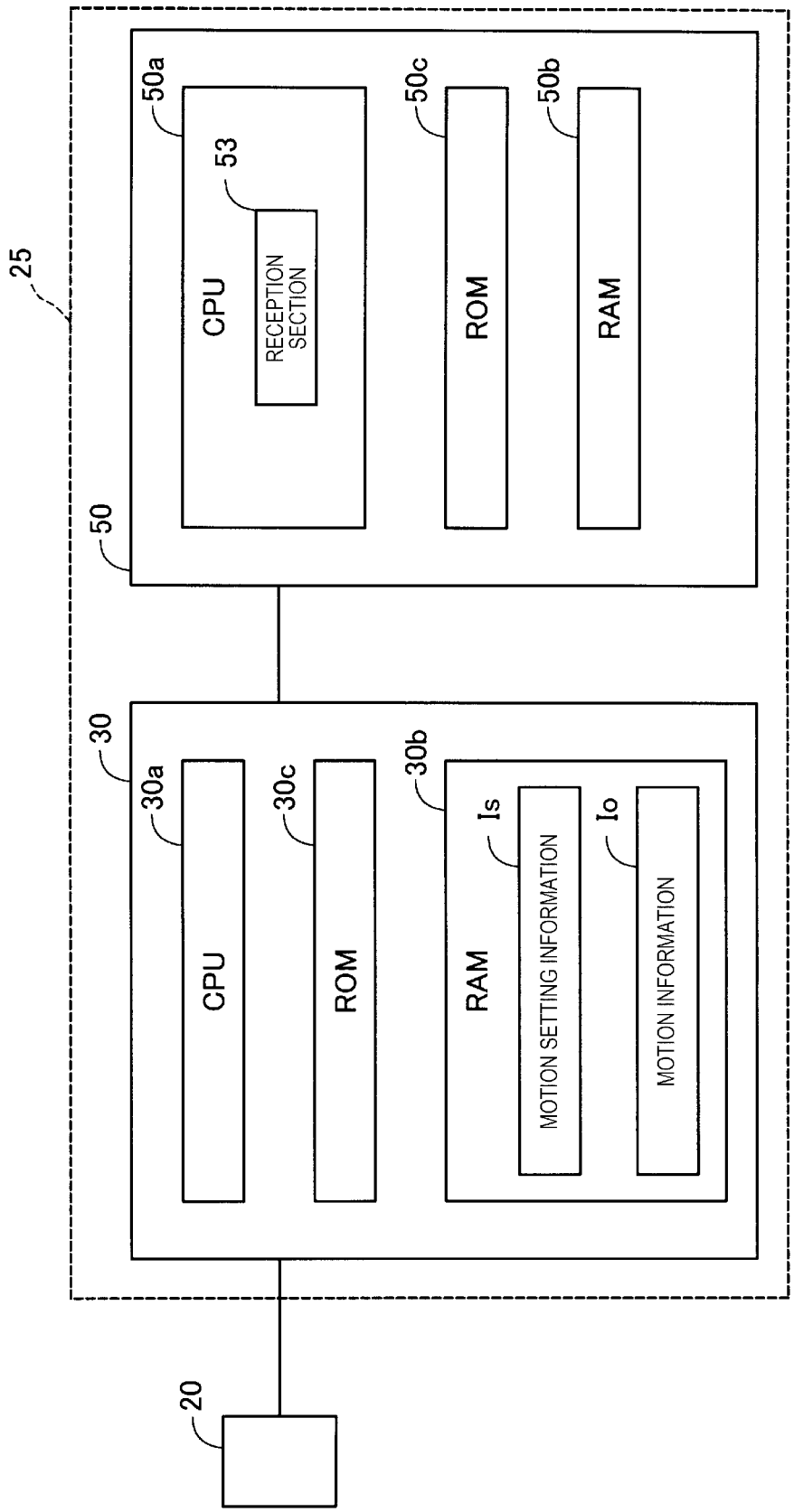
FIG. 2 is a block diagram of a robot control device.

FIG. 2 is a block diagram of the robot control device 25. The robot control device 25 is configured with the motion control device 30 and the teaching device 50. The motion control device 30 controls the arm Am of the robot 20 so that the TCP is positioned at a target position set by a teaching work by a user. The motion control device 30 includes a central processing unit (CPU) 30a which is a processor, a random access memory (RAM) 30b, and a read-only memory (ROM) 30c. A control program for controlling the robot 20 is installed in the motion control device 30. These hardware resources and the control program cooperate in the motion control device 30.

In moving from a certain target position to a next target position, the motion control device 30 can move the end effector EE by the arm Am based on an output from the distance measurement section Sd. More specifically, the motion control device 30 can perform a feedback control of the arm Am so that the distance between the target object and the end effector EE remains constant. The robot 20 can move the position of the end effector EE at 100 mm/s while performing such feedback control.

The robot system 1 according to the present embodiment can perform a work in a second setting to be described below even when the work WK has irregularities having a sharp inclination, which cannot be followed in the feedback control, in the area to be processed. The motion control device 30 can also move the end effector EE by the arm Am based on the output from the distance measurement section Sd.

The teaching device 50 teaches the motion control device 30 a target position. The teaching device 50 includes a CPU 50a, a RAM 50b, and a ROM 50c. A teaching program for teaching the motion control device 30 a target position is installed in the teaching device 50. These hardware resources and the teaching program cooperate in the teaching device 50.

As shown in FIG. 1, the teaching device 50 further includes an input device 57 and an output device 58. The input device 57 includes a mouse, a keyboard, a touch panel, or the like, for example, and receives an instruction from the user. The output device 58 includes a display, a speaker, or the like, for example, and outputs various types of information to the user.

2. Motion of Robot System

Figure 3:
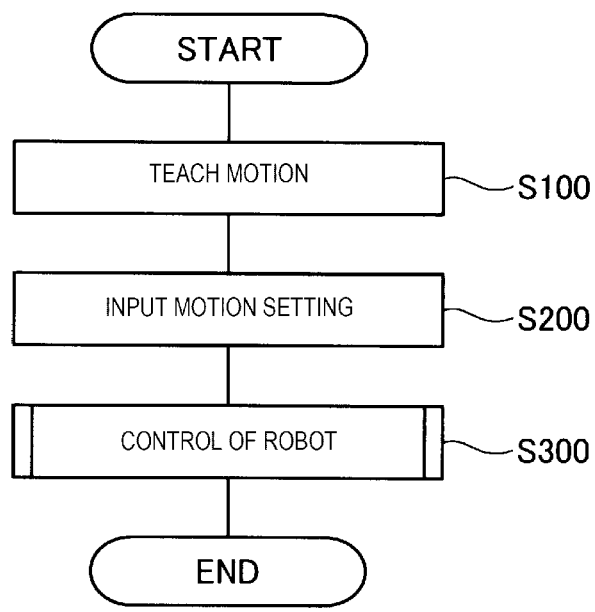
FIG. 3 is a flowchart showing processing when robot system is set in motion.

FIG. 3 is a flowchart showing processing when the robot system 1 is set in motion. The user teaches the motion control device 30 one or more target positions of the control point of the robot 20 in the work through the teaching device 50 in the step S100. More specifically, the user inputs each target position into the teaching device 50 through the input device 57. The teaching device 50 receives the input of one or more target positions of the control point from the user and transmits each input target position to the motion control device 30. The motion control device 30 stores one or more of the received target positions in the RAM 30b and controls the arm Am so that the TCP sequentially passes through each target position in the work. A function section of the CPU 50a of the teaching device 50 receiving the input of the target position from the user is shown as a reception section 53 in FIG. 2. The information indicating the target position stored in the RAM 30b of the motion control device 30 is shown as motion information Io.

The user designates a motion setting in the motion control device 30 through the teaching device 50 in the step S200. More specifically, the user inputs a first setting or a second setting as a motion setting of the work into the teaching device 50 through the input device 57. The teaching device 50 receives an input of the first setting or the second setting from the user and transmits the input motion setting to the motion control device 30. The motion control device 30 stores the received motion setting in the RAM 30b and controls the arm Am in accordance with the designated motion setting in the work. The function section of the CPU 50a of the teaching device 50 receiving the input of the motion setting from the user is the reception section 53. The information indicating the motion setting stored in the RAM 30b of the motion control device 30 is shown as motion setting information Is in FIG. 2.

In the "first setting", when the end effector EE is being moved by the arm Am based on the output from the distance measurement section Sd, the motion control device 30 stops moving the end effector EE when the distance measured by the distance measurement section Sd falls outside a preset reference range.

In the "second setting," when the end effector EE is being moved by the arm Am based on the output from the distance measure section Sd, the motion control device 30 continues to move the end effector EE not based on the output from the distance measurement section Sd when the distance measured by the distance measurement section Sd falls outsides the reference range. More specifically, the motion control device 30 moves the end effector EE toward the next target position that is not yet passed through among the target positions in the work being executed.

The motion control device 30 executes a work by controlling the robot 20 so that the TCP as a control point sequentially passes through one or more of the input target positions in the step S300. More specifically, upon receiving the output from the distance measurement section Sd, the motion control device 30 executes a work by controlling the arm Am of the robot 20 and the end effector EE in accordance with the designated motion setting.

Figure 4:
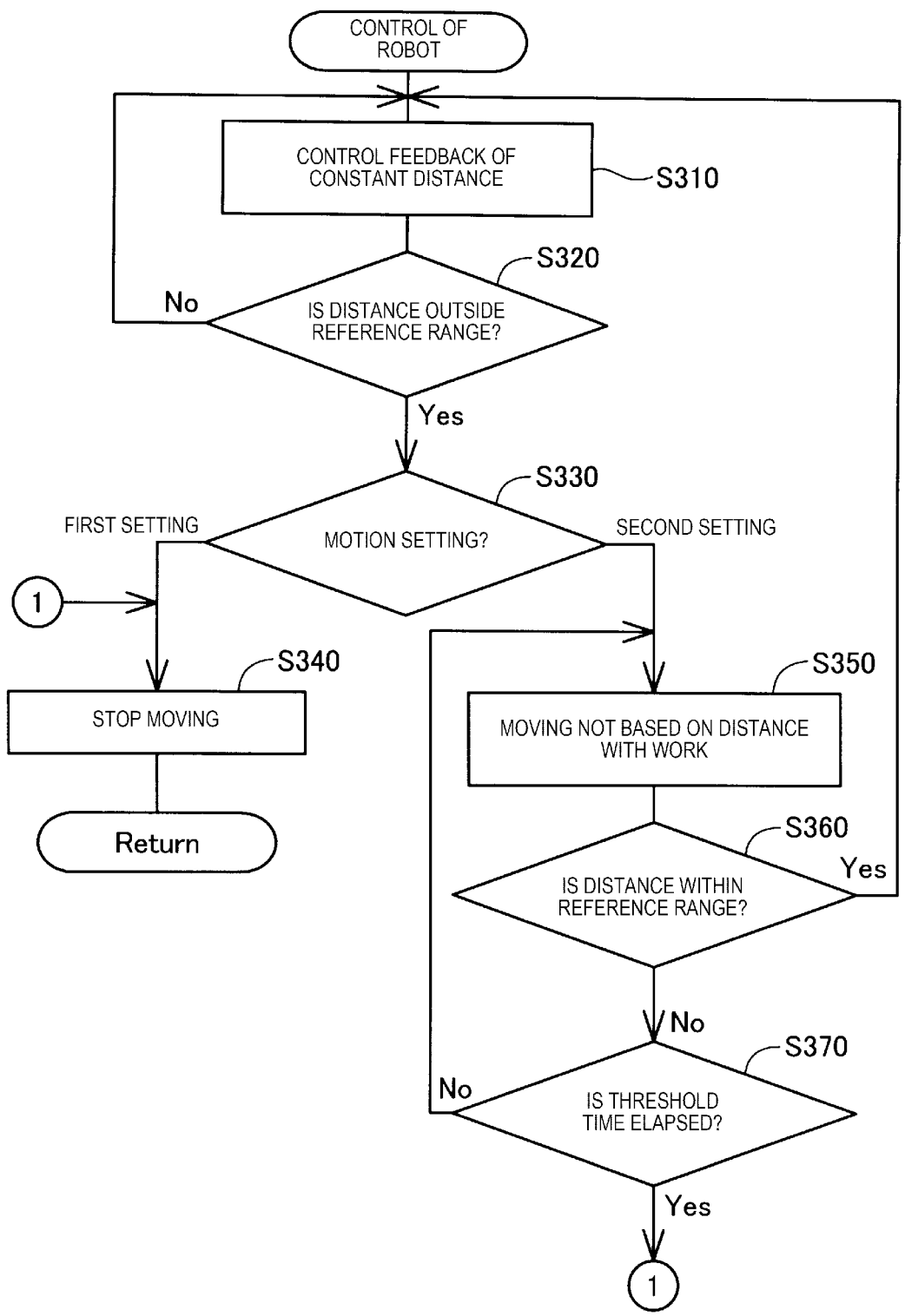
FIG. 4 is a flowchart showing contents of control of a robot in a step S300 of FIG. 3.

FIG. 4. is a flowchart showing the contents of control of the robot in the step S300 of FIG. 3. The processing of FIG. 4 is executed by the motion control device 30. The motion control device 30 can repeatedly perform the processing of FIG. 4 in a cycle of 200 microseconds.

The motion control device 30 controls the arm Am of the robot 20 in the step S310 so that the TCP as a control point sequentially passes through the target positions designated in the step S100 of FIG. 3. In moving from a certain target position toward the next target position, the motion control device 30 performs the feedback control of the arm Am based on the output from the distance measurement section Sd so that the distance between the work WK and the TCP of the end effector EE remains constant.

Figure 5:
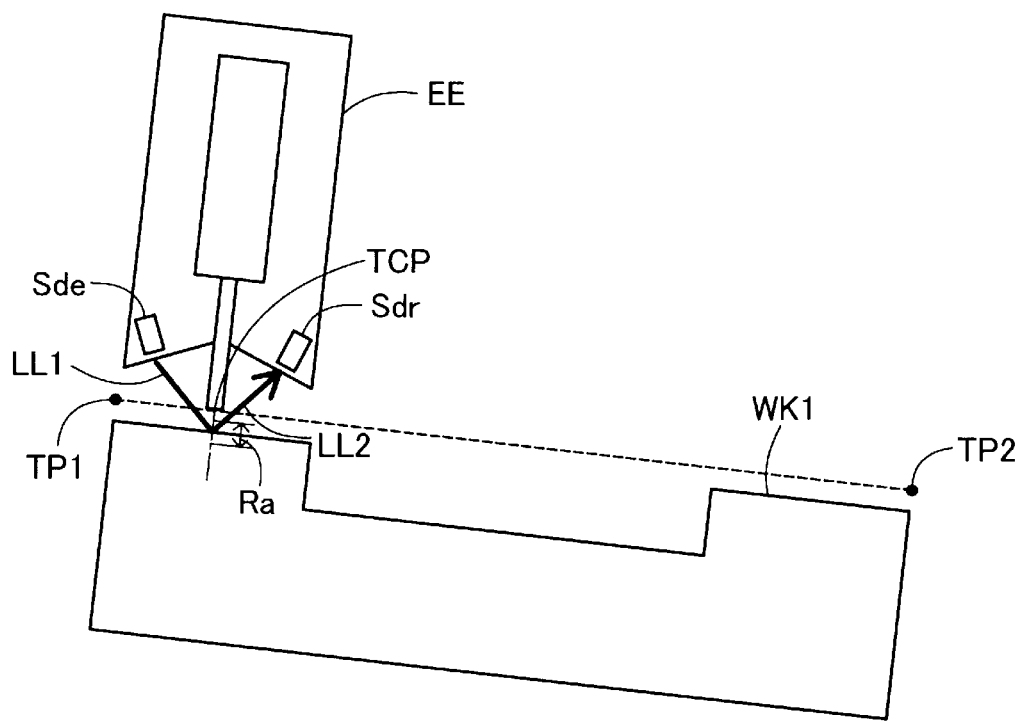
FIG. 5 is a descriptive view showing processing contents of a step S310 of FIG. 4.

FIG. 5 is a descriptive view showing processing contents of the step S310 of FIG. 4. In FIG. 5, to facilitate understanding of the technology, a work WK1 having a shape different from the shape of the work WK shown in FIG. 1 is used to show processing contents. In FIG. 5, to facilitate understanding of the technology, the dimensions of each section are exaggeratedly shown. Therefore, FIG. 5 is not intended to accurately reflect the dimensions of each section. The same applies to FIGS. 6 to 8.

In FIG. 5, the surface of the work WK1 exists within a range of positions where the distance measurement section Sd can measure the distance from the semiconductor later Sde and the light receiving element Sdr that constitute the distance measurement section Sd to the target object. Therefore, by receiving a reflected light LL2 of the laser beam LL1 by the work WK1 with the light receiving element Sdr, the distance measurement section Sd can measure the distance to the surface of the work WK1. As a result, in moving from the target position TP1 to the next target position TP2, the motion control device 30 can perform the feedback control of the arm Am based on the output from the distance measurement section Sd so that the distance between the work WK1 and the TCP of the end effector EE remains constant.

The motion control device 30 determines whether or not the distance between the work WK1 and the TCP of the end effector EE measured by the distance measurement section Sd, falls outside a preset reference range Ra in the step S320 of FIG. 4. The reference range Ra is preset within a range of positions where the distance measurement section Sd can measure the distance to the target object. The width of the reference range Ra is 0.8 mm in the present embodiment.

Figure 6:
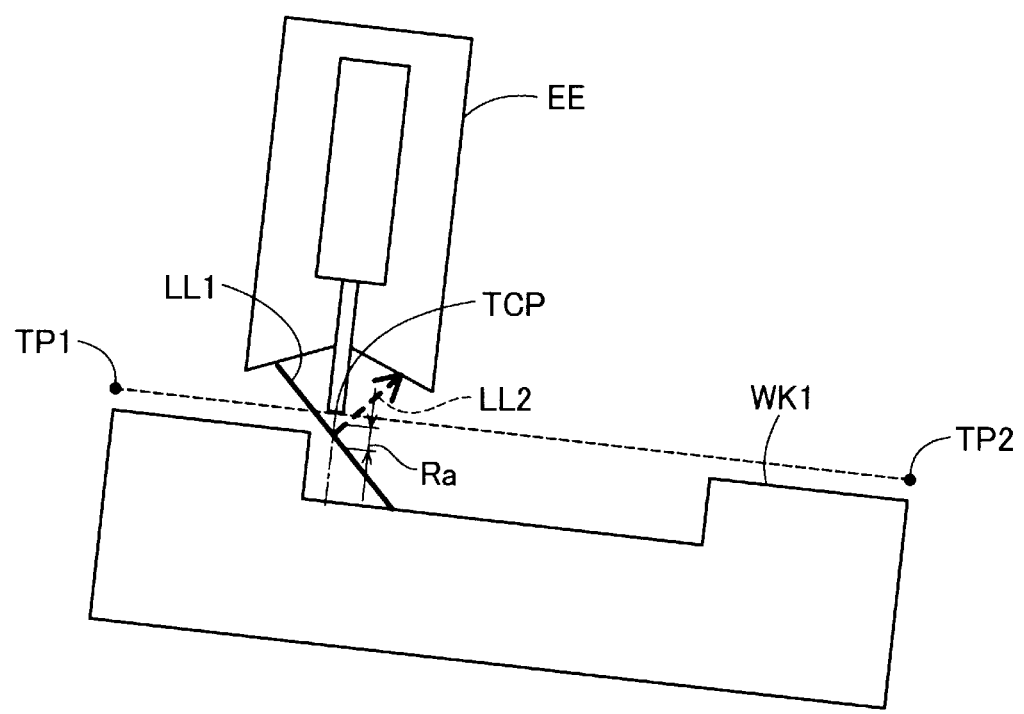
FIG. 6 is a descriptive view showing the processing contents of a step S320 of FIG. 4.

FIG. 6 is a descriptive view showing processing contents of the step S320 of FIG. 4. The surface of the work WK1 does not exist within the reference range Ra in FIG. 6. This is because the feedback control of the position of the end effector EE cannot follow the change in the surface shape of the work WK1. In such a state, the distance measurement section Sd cannot receive the reflected light LL2 of the laser beam LL1 by the work WK1 with the light receiving element Sdr. As a result, the motion control device 30 cannot perform the feedback control of the arm Am based on the output from the distance measurement section Sd so that the distance between the work WK1 and the TCP of the end effector EE remains constant.

When the distance between the work WK1 and the TCP of the end effector EE measured by the distance measurement section Sd falls outside the reference range Ra in the step S320 of FIG. 4, the processing proceeds to the step S330. When the distance between the work WK1 and the TCP of the end effector EE measured by the distance measurement section Sd falls within the reference range Ra, the processing returns to the step S310.

The motion control device 30 determines whether the motion setting designated in the step S200 of FIG. 3 is the first setting or the second setting in the step S330. When the motion setting designated in the step S200 is the first setting, the processing proceeds to the step S340. When the motion setting designated in the step S200 is the second setting, the processing proceeds to the step S350.

The motion control device 30 stops moving the end effector EE by the arm Am and ejecting of the fluid Ps from the end effector EE in the step S340. Then, the motion control device 30 outputs an error message from the output device 58 (refer to FIG. 1) through the teaching device 50. The output error message includes a message to the effect that the processing stopped because the distance between the work WK1 and the end effector EE fell outside the reference range Ra. The processing in FIG. 4 ends thereafter.

The motion control device 30 continues to move the end effector EE by the arm Am in the step S350. More specifically, the motion control device 30 moves the end effector EE so that the TCP as a control point is moved close to the next target position. The target positions are shown as TP1 and TP2 in FIGS. 5 to 8. In the first embodiment, the motion control device 30 linearly moves the end effector EE from the position of TCP at that time toward the next target position TP2. At that time, the end effector EE is moved, not based on the output from the distance measurement section Sd.

Figure 7:
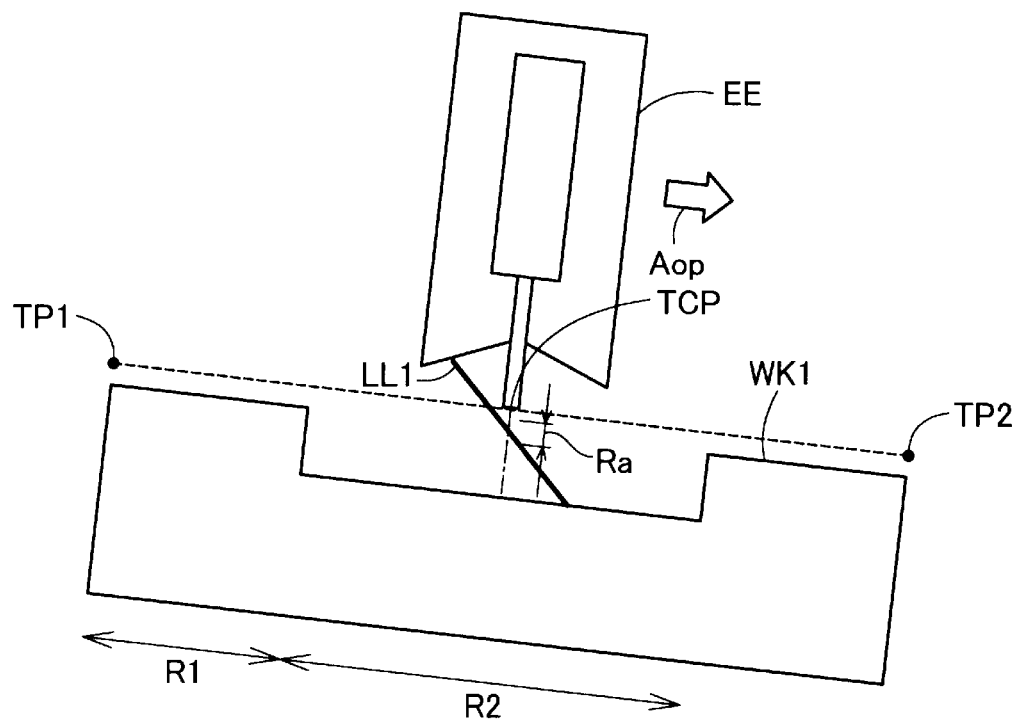
FIG. 7 is a descriptive view showing the processing contents of a step S350 of FIG. 4.

FIG. 7 is a descriptive view showing processing contents of the step S350 of FIG. 4. The surface of the work WK1 does not exist within the reference range Ra in FIG. 7. Therefore, the motion control device 30 cannot perform the feedback control of the arm Am based on the output from the distance measurement section Sd so that the distance between the work WK1 and the TCP of the end effector EE remains constant. The motion control device 30 moves the end effector EE so that the TCP as a control point is moved close to the next target position TP2 in the step S350 of FIG. 4 (refer to arrow Aop of FIG. 7). The range in which the end effector EE is moved by the processing of the step S310 is shown as the range R1 in FIG. 7. The range in which the end effector EE is moved by the processing of the step S350 is shown as R2.

Even when the distance between the work WK1 and the end effector EE falls outside the reference range Ra, it is possible to continue the work, initially conceived, based on the target position TP2 by performing such processing.

Further, even when there are irregularities having a sharp inclination in the area to be processed as on the upper surface of the work WK shown in FIG. 1, it is possible to continuously perform the work of adhering the fluid Ps to the work WK in the second setting by performing such processing. As a result, it is possible to effectively apply the fluid Ps to the work WK1.

The motion control device 30 determines whether or not the distance between the work WK1 and the TCP of the end effector EE measured by the distance measurement section Sd falls within the reference range Ra in the step S360 of FIG. 4. The reference range Ra is the same as the reference range Ra used in the determination of the step S320. When the distance between the work WK1 and the TCP of the end effector EE measured by the distance measurement section Sd falls outside the reference range Ra, the processing proceeds to the step S370. When the distance between the work WK1 and the TCP of the end effector EE measured by the distance measurement section Sd falls within the reference range Ra, the processing returns to the step S310. That is, while moving to the next target position TP2, the motion control device 30 performs the feedback control of the arm Am based on the output from the distance measurement section Sd so that the distance between the work WK1 and the TCP of the end effector EE remains constant.

Figure 8:
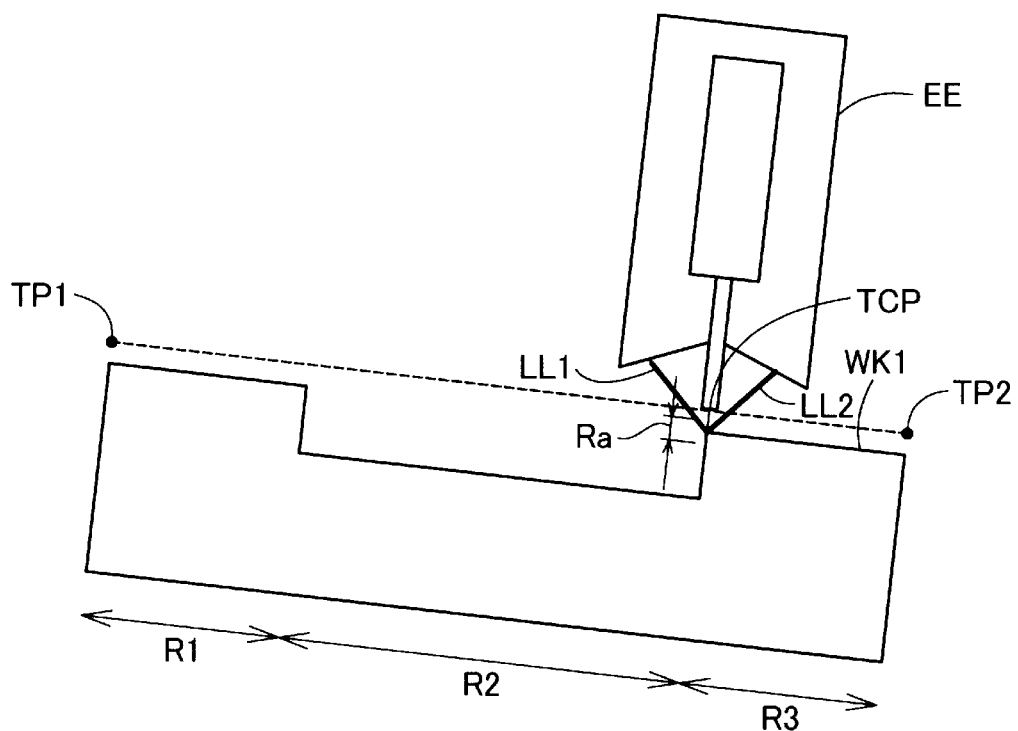
FIG. 8 is a descriptive view showing the processing contents performed in a step S310 through a step S360.

FIG. 8 is a descriptive view showing processing contents performed in the step S310 through the step S360 of FIG. 4. The surface of the work WK1 exists within the reference range Ra in FIG. 8. Therefore, by receiving a reflected light LL2 of the laser beam LL1 by the work WK1 with the light receiving element Sdr, the distance measurement section Sd can measure the distance to the surface of the work WK1. As a result, in moving to the next target position TP2, the motion control device 30 can perform the feedback control of the arm Am based on the output from the distance measurement section Sd so that the distance between the work WK1 and the TCP of the end effector EE remains constant.

The range in which the end effector EE is moved by the processing of the step S310 is shown as the range R1 in FIG. 8. The range in which the end effector EE is moved by the processing of the step S350 is shown as the range R2. The range in which the end effector EE is moved by the processing of the step S310 through the step S360 is shown as the range R3.

By performing such processing, even when there are irregularities having a sharp inclination in the area to be processed like the upper surface of the work WK shown in FIG. 1, it is possible to continuously perform a work on the work WK while considering the distance between the work WK and the end effector EE as much as possible by performing a control based on the output from the distance measurement section Sd (refer to S350 of FIG. 4) and a control not based on the output from the distance measurement section (refer to S310).

The motion control device 30 determines whether or not the elapsed time after the distance between the work WK1 and the TCP of the end effector EE measured by the distance measurement section Sd falls outside the reference range Ra exceeds threshold time in the step S370 of FIG. 4. The threshold time is preset and can be 0.5 seconds, for example. When the elapsed time does not exceed the threshold time, the processing returns to the step S350. When the elapsed time exceeds the threshold time, the processing proceeds to the step S340. That is, the motion control device 30 stops moving the end effector EE by the arm Am and ejecting of the fluid Ps from the end effector EE.

By performing such processing, it is possible to reduce the risk of the end effector EE colliding with the work WK or other objects by continuous movement by the processing of the step S350.

The works WK and WK1 in the present embodiments are also referred to as "target objects". The end effector EE is also referred to as a "work section". The arm Am is also referred to as a "movable section". The motion control device 30 is also referred to as a "control section". The robot control device 25 is also referred to as a "control device".

B. Second Embodiment

In the robot system 1 according to the first embodiment, the motion control device 30 linearly moves the end effector EE from the position of the TCP at that time toward the next target position in the step S350 of FIG. 4 (refer to arrow Aop of FIG. 7). However, in the robot system according to a second embodiment, the motion control device 30 performs processing different from the processing in the first embodiment in the step S350 of FIG. 4. A robot system according to the second embodiment is the same as the robot system 1 according to the first embodiment in other points.

Figure 9:
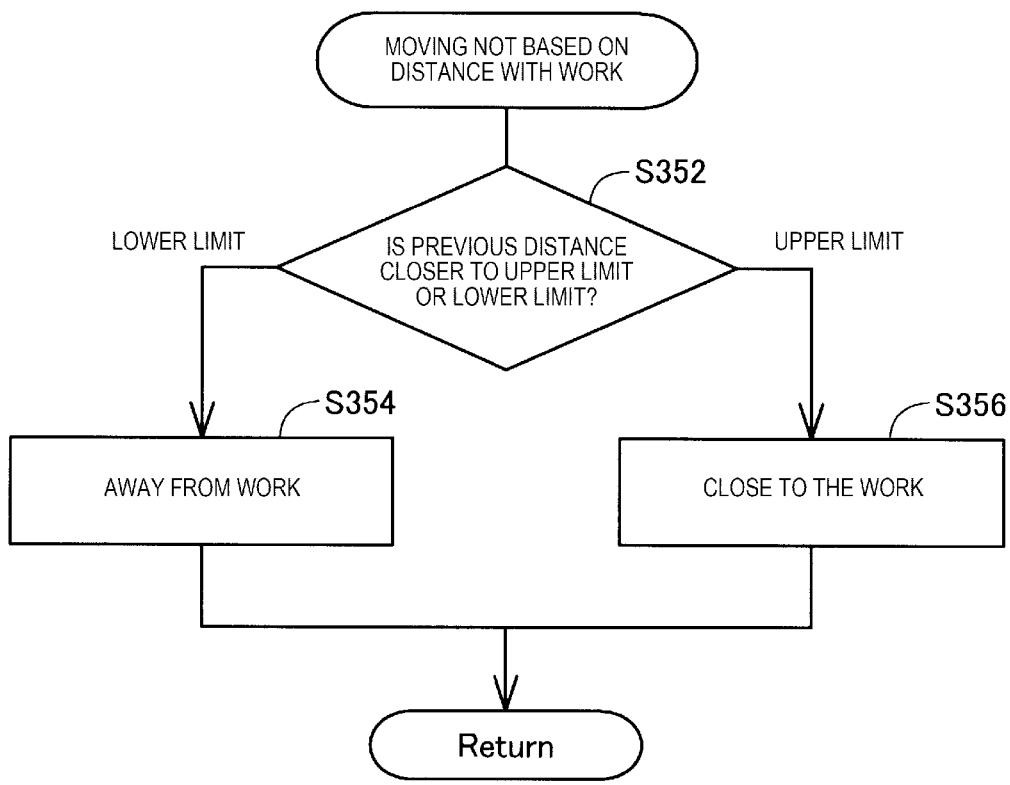
FIG. 9 is a flowchart showing detailed processing in the step S350 of FIG. 4 in a second embodiment.

FIG. 9 is a flowchart showing detailed processing in the step S350 of FIG. 4 in the second embodiment. In the step S352, the motion control device 30 determines which of the upper limit and the lower limit of the reference range Ra the distance between the work WK and the TCP is close to immediately before the distance between the work WK and the TCP of the end effector EE falls outside the reference range Ra in the step S320 of FIG. 4. The value of "immediately before" of the distance between the work WK and the TCP of the end effector EE is the distance between the work WK and the TCP of the end effector EE in the immediately preceding processing in a cycle where the motion control device 30 repeatedly executes the processing of FIG. 4. Specifically, the determination in the step S352 can be performed based on a voltage value of the output signal of the distance measurement section Sd.

The upper limit of the reference range Ra of the distance corresponds to the lower end of the reference range Ra shown in FIGS. 5 to 8, that is, the end on the side far from the TCP. The lower limit of the reference range Ra of the distance corresponds to the upper end of the reference range Ra shown in FIGS. 5 to 8, that is, the end on the side close to the TCP.

When the distance between the work WK and the TCP is close to the lower limit of the reference range Ra in the step S352, the processing proceeds to the step S354. When the distance between the work WK and the TCP is close to the upper limit of the reference range Ra, the processing proceeds to the step S356.

The motion control device 30 moves the end effector EE so as to move the end effector EE away from the work WK in the step S354. More specifically, the motion control device 30 adds the velocity component for moving the end effector EE to the side opposite to the side where the work WK was detected immediately before along the Z-axis of the hand coordinate system HC to the velocity component of moving the TCP by the processing up to that time and moves the end effector EE. Thereafter, the processing proceeds to the step S360 of FIG. 4. The velocity component of moving the end effector EE to the side opposite to the side where the work WK was detected is set to zero after the predetermined time.

Figure 10:
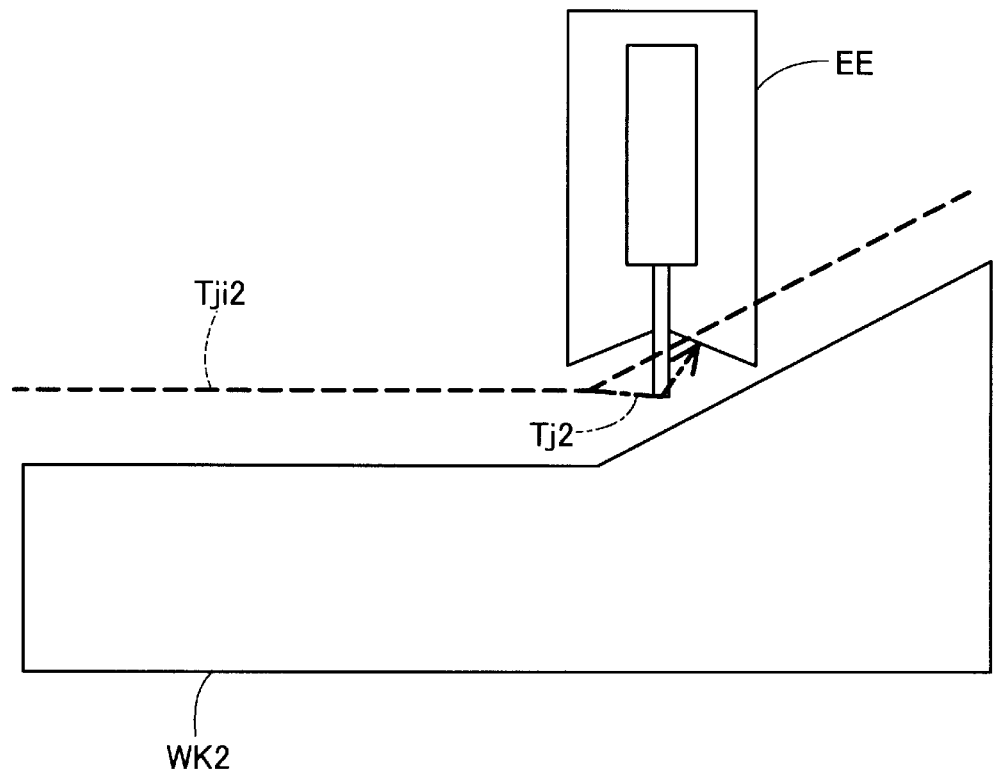
FIG. 10 is a descriptive view showing the processing in a step S354 of FIG. 9.

FIG. 10 is a descriptive view showing processing in the step S354 of FIG. 9. In FIG. 10, to facilitate understanding of the technology, a work WK2 having a shape different from the shape of the work WK shown in FIG. 1 is used to show the processing contents. In FIG. 10, to facilitate understanding of the technology, the dimensions of each section are exaggeratedly shown. Therefore, FIG. 10 is not intended to accurately reflect the dimensions of each section. The same applies to FIG. 11.

When the end effector EE is moved to the work WK2 too close and the distance between the work WK and the TCP falls outside the reference range Ra, the immediately preceding distance is close to the lower limit of the reference range Ra. Therefore, the motion control device 30 moves the end effector EE away from the work WK2 in the step S354 of FIG. 9. Such a situation arises because the feedback control of the position of the end effector EE cannot follow the change of the surface shape of the work WK2. The points at a constant distance from the surface of the work WK2 are denoted by Tji2 in FIG. 10. Then, the trajectory of the TCP of the end effector EE moved through the processing of the steps S352 and 5354 of FIG. 9 is denoted by Tj2.

That the distance between the work WK and the TCP is close to the lower limit of the reference range Ra means that the possibility of the surface of the work WK2 being positioned between the end on the TCP side of the reference range Ra and the TCP is high in the step S325 of FIG. 9. Therefore, by performing the processing described above, it is possible to reduce the risk of the work section colliding with the target object or other objects.

The distance by which the TCP is moved away from the work WK in the step S354 of FIG. 9 is preset to be equal to or less than the difference between the upper limit value and the lower limit value of the reference range Ra of the distance. In the present embodiment, the difference between the upper limit value and the lower limit value of the reference range Ra is 0.8 mm. Therefore, it is possible to set the distance by which the TCP is moved away from the work WK to 0.6 mm, for example.

In the situation where the possibility of the surface of the work WK2 being positioned between the end on the TCP side of the reference range Ra and the TCP is high, if the TCP is moved away from the surface of the work WK2 by the distance exceeding the difference between the upper limit value and the lower limit value of the reference range Ra, the possibility of the surface of the work WK2 passing through the area corresponding to the reference range Ra of the distance and ending up being positioned outside the reference range Ra on the opposite side. In that case, the distance between the work WK and the TCP of the end effector EE falls outside the reference range Ra, and it is not possible to perform the feedback control of the distance. However, by performing the processing described above, it is possible to increases the possibility of the surface of the work WK being positioned in a range corresponding to the reference range Ra without relying on the output from the distance measurement section Sd and of the distance between the work WK and the end effector EE being close to the conceived distance. As a result, it is possible to improve the quality of the result of the continued work.

The motion control device 30 moves the end effector EE so that the end effector EE is moved close to the work WK in the step S356 of FIG. 9. More specifically, the motion control device 30 adds the velocity component of moving the end effector EE to the side where the work WK was detected immediately before along the Z-axis of the hand coordinate system HC to the velocity component of moving the TCP by the processing up to that time and moves the end effector EE. Thereafter, the processing proceeds to the step S360 of FIG. 4. The velocity component for moving the end effector EE to the side where the work WK was detected is set to zero after the predetermined time.

Figure 11:
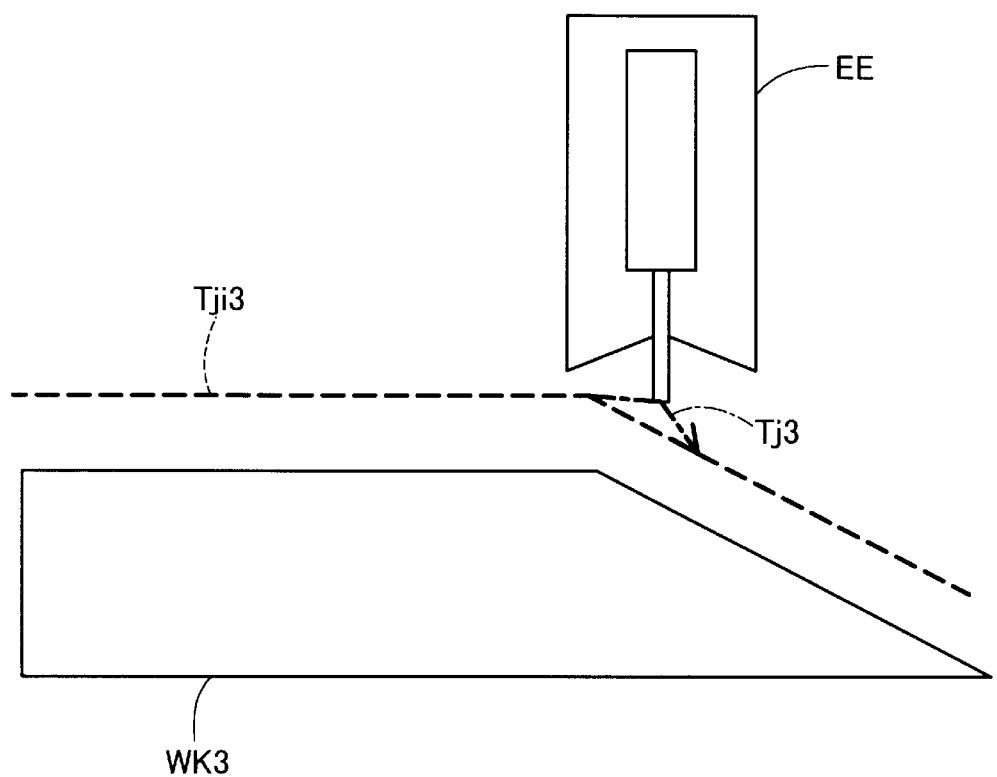
FIG. 11 is a descriptive view showing the processing in a step S356 of FIG. 9.

FIG. 11 is a descriptive view showing processing in the step S356 of FIG. 9. In FIG. 11, to facilitate understanding of the technology, a work WK3 different from the work WK shown in FIG. 1 is used to show the processing contents. When the end effector EE is too far from the work WK3 and the distance between the work WK and the TCP falls outside the reference range Ra, the immediately preceding distance is close to the upper limit of the reference range Ra. Therefore, the motion control device 30 moves the end effector EE while moving the end effector EE close to the work WK2 in the step S354 of FIG. 9. Such a situation arises because the feedback control of the position of the end effector EE cannot follow the change of the surface shape of the work WK3. The points at a constant distance from the work WK3 are denoted by Tji3 in FIG. 11. Then, the trajectory of the TCP of the end effector EE moved through the processing of the steps S352 and 5356 of FIG. 9 is denoted by Tj3.

When the possibility of the distance between the work WK3 and the end effector EE being larger than the reference range Ra is high, by performing such processing, it is possible to bring the distance between the work WK3 and the end effector EE close to the conceived distance without relying on an output from the distance measurement section Sd. As a result, it is possible to improve the quality of the result of the continued work.

In the step S356 of FIG. 9, the distance by which the TCP is moved close to the work WK is preset to be equal to or less than the difference between the upper limit value and the lower limit value of the reference range Ra of the distance.

The distance by which the TCP is moved close to the work WK can be 0.6 mm, for example.

That the distance between the work WK1 and the TCP of the end effector EE falls outside the reference range Ra in the step S320 of FIG. 4 means that no object exists in the area corresponding to the range of difference between the upper limit value and the lower limit value of the reference range Ra around the TCP in the Z-axis direction of the hand coordinate system HC. Therefore, by performing the processing described above, it is possible to increase the possibility of the distance between the work WK and the end effector EE being close to the conceived distance without causing the end effector EE to collide with the work WK without relying on the output from the distance measurement section Sd. As a result, it is possible to improve the quality of the result of the continued work.

C. Third Embodiment

In a third embodiment, the motion control device 30 performs predetermined processing between the steps S310 and S320 of FIG. 4. A robot system according to the third embodiment is the same as the robot system 1 according to the first embodiment in other points.

Figure 12:
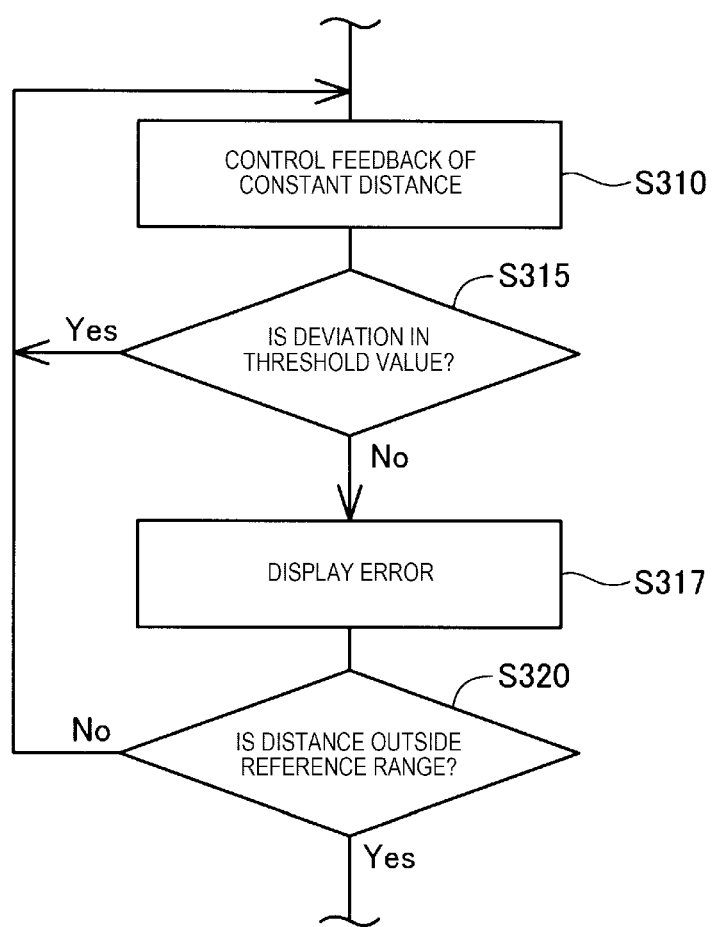
FIG. 12 is a flowchart showing the contents of control of the robot in steps S310 to S320 of FIG. 4.

FIG. 12 is a flowchart showing contents of the control of the robot in the steps S310 to S320 of FIG. 4. In the third embodiment, after the step S310 of FIG. 4, the motion control device 30 determines whether or not the distance D1 between the ideal trajectory of the TCP and the actual trajectory of the TCP is larger than a preset threshold value ThD in the step S315. The threshold value ThD is preset.

The ideal trajectory of the TCP is calculated in advance based on CAD information of the work WK. More specifically, it is possible to obtain the ideal trajectory of the TCP by calculating an ideal trajectory of the TCP in the coordinate system of the work WK based on the CAD information of the work WK and converting the trajectory into a trajectory in the robot coordinate system RC. The coordinate system of the work WK has an X-axis and a Y-axis orthogonal to each other inside a surface of the work WK to which the fluid Ps is applied and has a Z-axis in the direction orthogonal to the X-axis and the Y-axis.

When the diverging distance between the ideal trajectory of the TCP and the actual trajectory of the TCP is equal to or less than the threshold value ThD in the step S315, the processing returns to the step S310. When the diverging distance D1 is larger than the threshold value ThD, the processing proceeds to the step S317.

The motion control device 30 outputs an error message from the output device 58 (refer to FIG. 1) through the teaching device 50 in the step S317. The output error message includes a message to the effect that the diverging distance between the original trajectory of the end effector EE and the actual trajectory of the end effector EE is larger than the threshold value ThD. Thereafter, the processing proceeds to the step S320. The following processing is the same as the processing of FIG. 4 according to the first embodiment.

Figure 13:
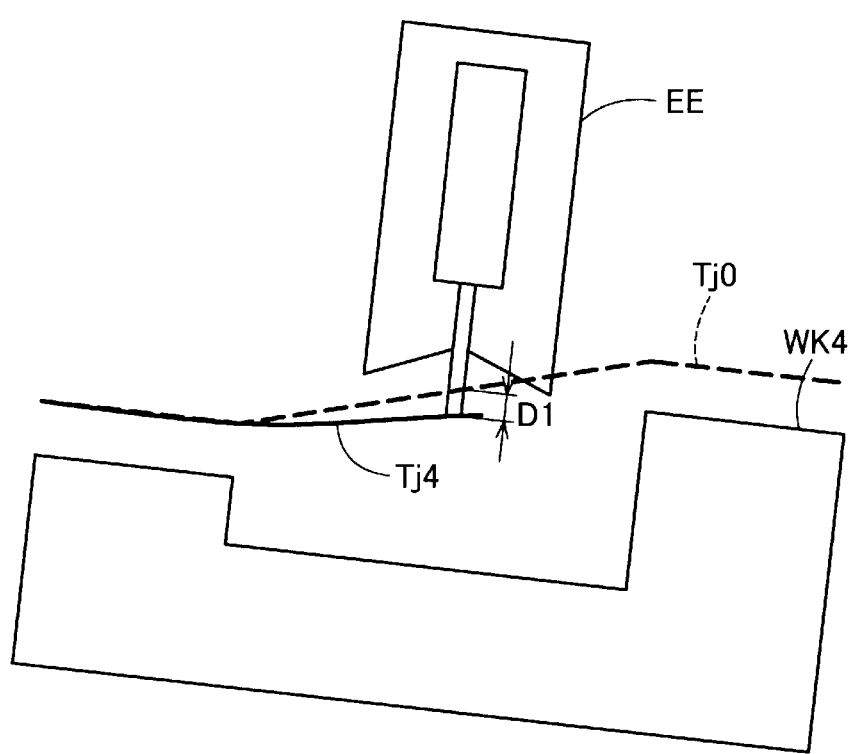
FIG. 13 is a descriptive view showing the processing contents of steps S315 and S317 of FIG. 12.

FIG. 13 is a descriptive view showing processing contents of the steps S315 and 5317 of FIG. 12. To facilitate understanding of the technology, a work WK4 having a shape different from the shape of the work WK shown in FIG. 1 is used to show the processing contents in FIG. 13. The diverging distance D1 between the ideal trajectory Tj0 of the TCP calculated in advance based on the CAD information and the actual trajectory Tj4 of the TCP is shown in FIG. 13. When the diverging distance D1 is large than the threshold value ThD, in the step S317, a message to the effect that the diverging distance D1 between the original trajectory Tj0 of the end effector EE and the actual trajectory Tj4 of the end effector EE is larger than the threshold value ThD is displayed in the output device 58.

According to such an embodiment, before the user stops the motion of the robot 20 in the step S340 of FIG. 4, the user can know in advance that the original trajectory Tj0 of the end effector EE and the actual trajectory Tj4 of the end effector EE diverge.

D. Fourth Embodiment

In the first embodiment, the dispenser ejecting the fluid Ps is attached to the tip end of the arm Am as an end effector EE (refer to FIG. 1). Then, the motion control device 30 controls the motion of the arm Am and, as a result, controls the position of the dispenser attached to the tip end of the arm Am. However, in the fourth embodiment, an end effector EE2 attached to the tip end of the arm Am holds the work WK. Then, a dispenser Dp is disposed at a fixed position in the robot coordinate system RC. The motion control device 30 controls the motion of the arm Am and, as a result, controls the position of the work WK, held by the end effector EE2, with respect to the dispenser Dp.

Figure 14:
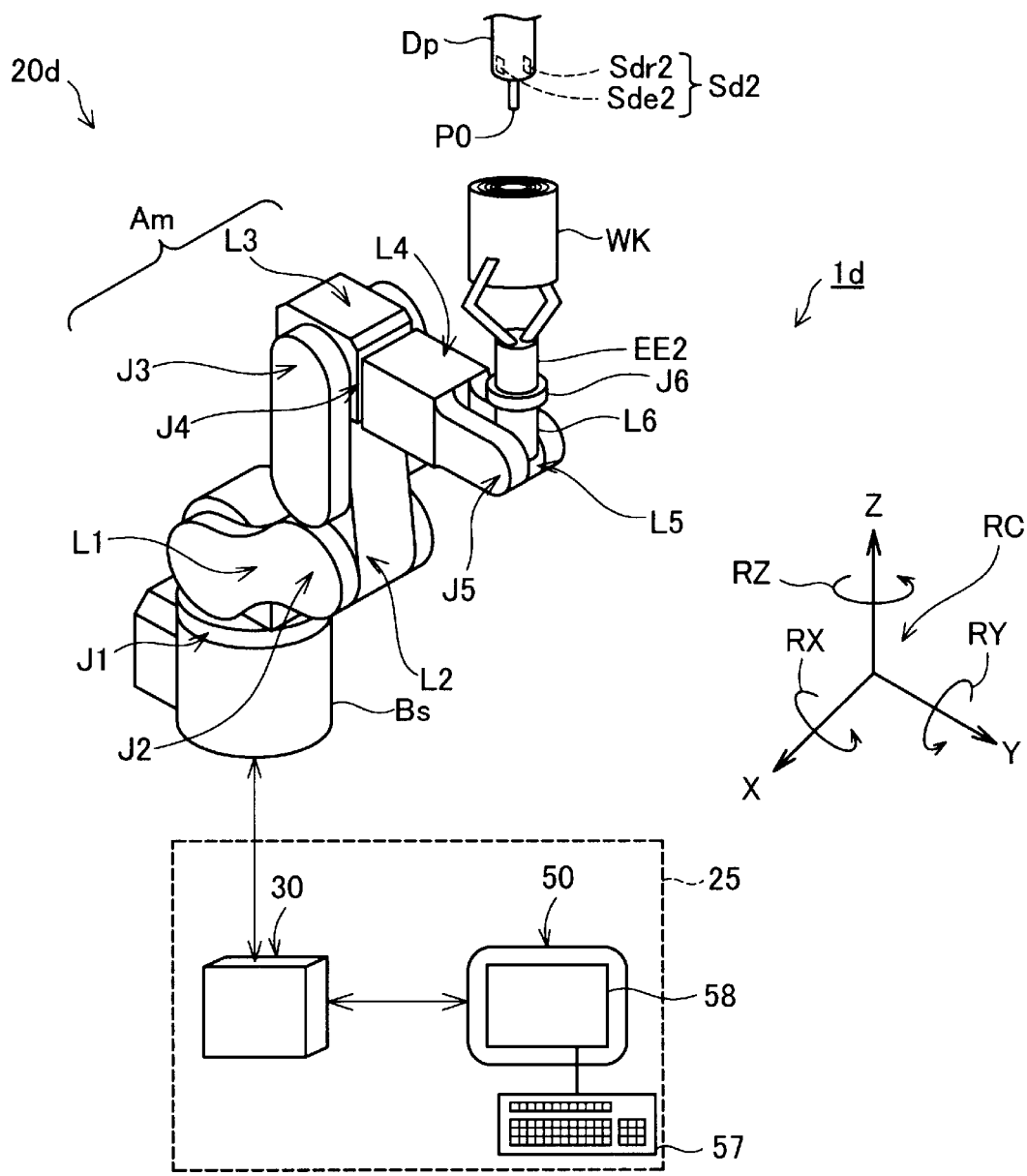
FIG. 14 is a view showing a hardware configuration of the robot system according to the present embodiment.

FIG. 14 is a view showing a hardware configuration of a robot system 1d according to the present embodiment. The robot system 1d includes a robot 20d and the robot control device 25. The arm Am of the robot 20d holds the work WK performing a work by the dispenser Dp and moves the work WK.

The dispenser Dp functions as a work section performing work on the work WK. More specifically, the dispenser Dp ejects the fluid Ps as an adhesive to be adhered to the work WK.

A distance measurement section Sd2 is provided in the dispenser Dp. The distance measurement section Sd2 includes a semiconductor laser Sde2 and a light receiving element Sdr2. The configuration of the distance measurement section Sd2 is the same as the distance measurement section Sd according to the first embodiment.

The distance measurement section Sd2 can measure the distance between the dispenser Dp and the target object at a position away from the dispenser Dp in an ejection direction of the fluid Ps from a reference point P0 defined at a tip end of a nozzle of the dispenser Dp. The distance measurement section Sd2 is fixed to the dispenser Dp. Therefore, based on the output from the distance measurement section Sd2, it is possible to measure the distance between the target object and the dispenser Dp. The distance measurement section Sd2 transmits an output indicating the distance between the target object and dispenser Dp to the motion control device 30. The motion control device 30 receives the output from the distance measurement section Sd2, controls the motion of the arm Am, and, as a result, controls the position of the end effector EE attached to the tip end of the arm Am.

In the fourth embodiment, the "first setting" input in the step S200 of FIG. 3 is a motion setting in which, when the work WK is being moved by the arm Am based on an output from the distance measurement section Sd2, the motion control device 30 stops moving the work WK when the distance measured by the distance measurement section Sd2 falls outside the preset reference range Ra.

In the fourth embodiment, the "second setting" input in the step S200 of FIG. 3 is a motion setting in which, when the work WK is being moved by the arm Am based on an output from the distance measurement section Sd2, the motion control device 30 continues to move the work WK not based on the output from the distance measurement section Sd2 when the distance measured by the distance measurement section Sd2 falls outside the reference range Ra.

In the fourth embodiment, the processing in the steps S320 to S350 of FIG. 4 is performed in accordance with the first setting and the second setting described above. The fourth embodiment is the same as the first embodiment except the points described above.

Even in such an aspect, even when the work WK has irregularities having a sharp inclination in an area to be processed, it is possible to continuously perform work in the second setting. As a result, it is possible to efficiently perform work on the work WK.

The work WK in the present embodiment is also referred to as a "target object". The dispenser Dp is also referred to as a "work section". The arm Am is also referred to as a "movable section". The motion control device 30 is also referred to as a "control section". The robot control device 25 is also referred to as a "control device".

Figure 15:
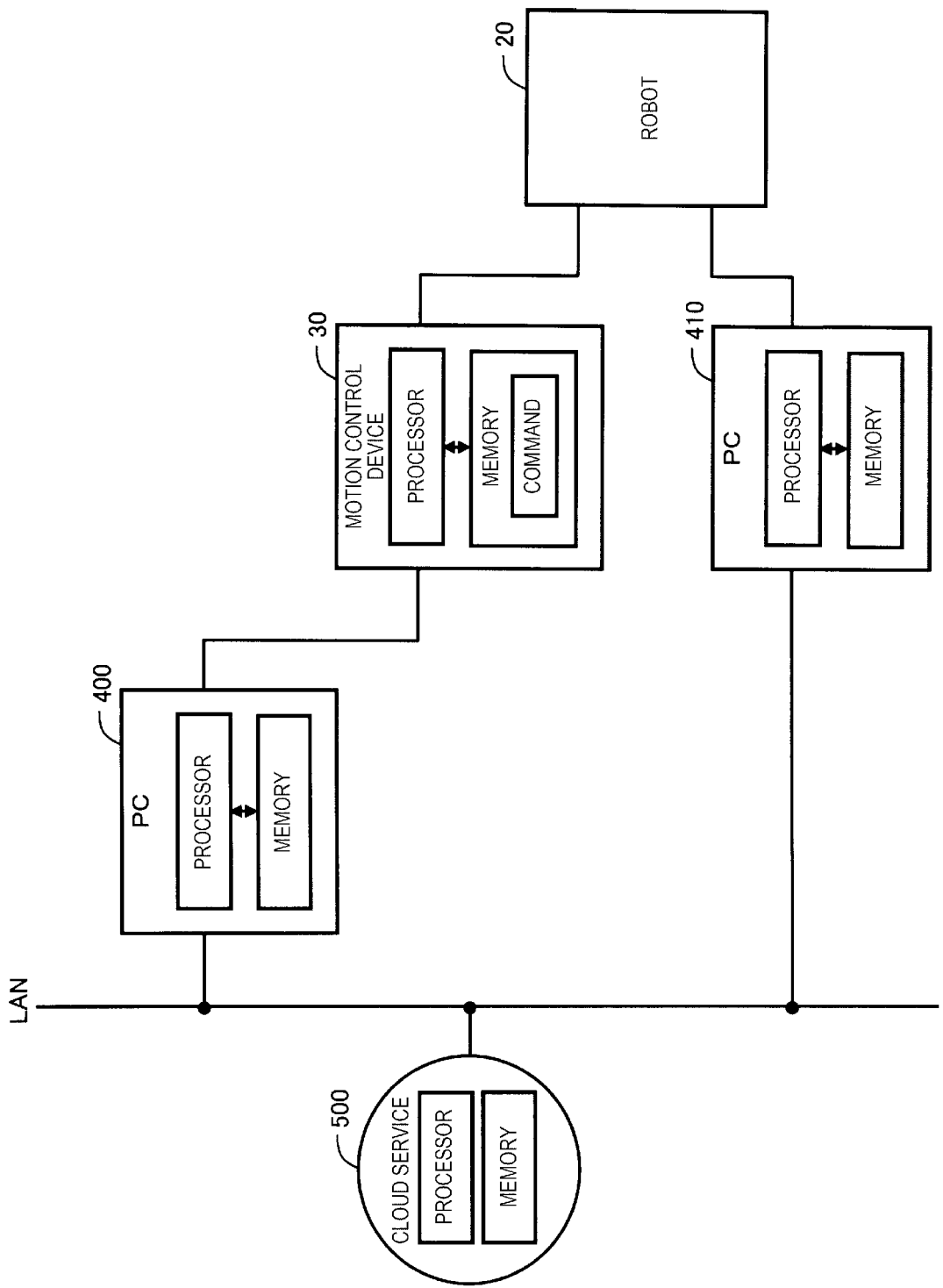
FIG. 15 is a conceptual view showing an example in which a control device of a robot is configured with a plurality of processors.

E. Fifth Embodiment (1) FIG. 15 is a conceptual view showing an example in which a control device of a robot is configured with a plurality of processors. In this example, in addition to a robot 20 and a motion control device 30 thereof, personal computers 400 and 410 and cloud service 500 provided through a network environment such as a LAN are depicted. The personal computers 400 and 410 include a processor and a memory respectively. Further, a processor and a memory can also be used in the cloud service 500. The processor executes a computer executable command. By using a part or all of the plurality of these processors, it is possible to realize a robot control device 25 including a motion control device 30 and a teaching device 50. Further, by using a part or all of the plurality of these memories, it is also possible to realize a storage section storing various types of information.

Figure 16:
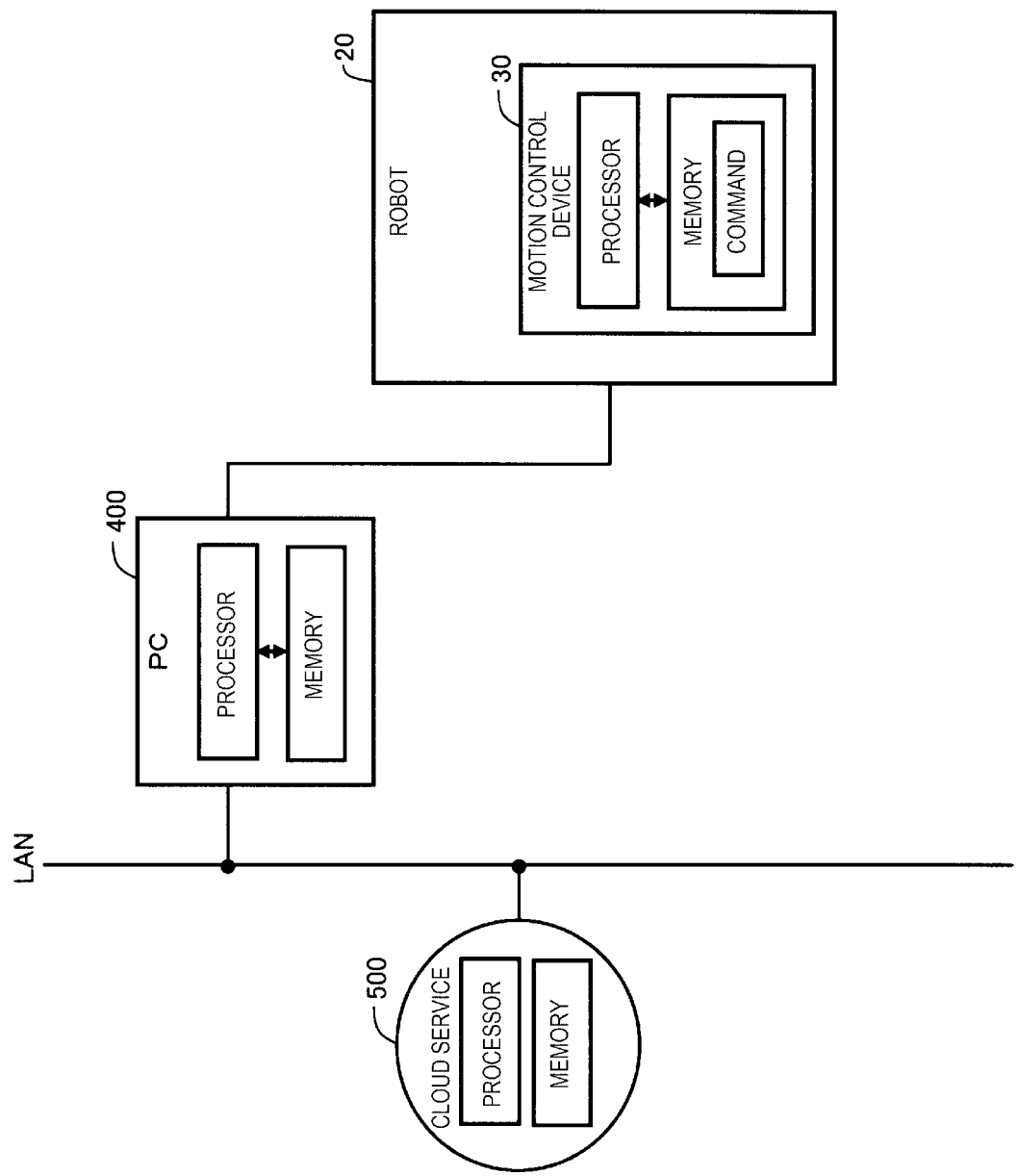
FIG. 16 is a conceptual view showing another example in which a control device of a robot is configured with a plurality of processors.

(2) FIG. 16 is a conceptual view showing another example in which a control device of a robot is configured with a plurality of processors. In this example, a difference from FIG. 15 is that the motion control device 30 of the robot 20 is stored in the robot 20. Also in this example, by using a part or all of the plurality of processors, it is possible to realize the robot control device 25 including the motion control device 30 and the teaching device 50. Further, by using apart or all of the plurality of memories, it is also possible to realize a storage section storing various types of information.

F. Other Embodiments

F1. Other Embodiment 1

(1) In the embodiments described above, the distance measurement sections Sd and Sd2 are laser displacement meters (refer to FIGS. 1 and 14). However, it is also possible to adopt an embodiment in which the distance measurement section is not a laser displacement meter and is linked with an auto-focus function of a camera, for example.

(2) In the embodiments described above, the motion control device 30 repeatedly performs the processing of FIG. 4 in a cycle of 200 microseconds. However, the cycle of control performed by the control device can be lengthened or shortened. By shortening the cycle of control performed by the control device, it is possible to follow the sharper irregularities of the shape of the processing area of the target object. By lengthening the cycle of control performed by the control device, it is possible to further smooth the motion or to further stabilize the control.

(3) In the embodiments described above, the user teaches a target position in the step S100 of FIG. 3. However, it is also possible to adopt an embodiment in which the target position is automatically set based on the CAD information of the work, for example.

(4) In the embodiments described above, the reception section 53 of the CPU 50a of the teaching device 50 receives the first setting or the second setting in the step S100 of FIG. 3. However, the reception section may be configured to input a setting other than the first setting and the second setting. That is, the reception section may be configured to selectively receive the first setting and the second setting. It should be noted that "to selectively receive the first setting and the second setting" means that the" first setting" or the "second setting" is received and that the setting of the "first setting and second setting" is not received. Then, "to selectively receive the first setting and the second setting" does not mean that a setting other than the first setting and the second setting is not received.

(5) In the embodiments described above, the motion setting is input in the step S200 after the motion is taught in the step S100 of FIG. 3. However, it is also possible to perform the input of the motion setting first and to perform the teaching of the motion later. For example, in an embodiment in which a program list is created except the parameter value of the target position and then, the parameter value indicating the target position is taught, it is also possible to adopt an embodiment in which an argument designating the motion setting as an argument of a command in the program list is written into a program list.

(6) In the embodiment described above, the user inputs the motion setting in the step S200 of FIG. 3. However, it is also possible to adopt an embodiment in which the motion setting is automatically set in accordance with a command specifying the motion in the program list.

(7) In the first embodiment described above, the reference range Ra (refer to 5320 of FIG. 4) is set in advance within a range of positions at which the distance measurement section Sd can measure the distance to the target object. However, the reference range may coincide with the range of positions at which the distance measurement section can measure the distance to the target object.

(8) In the embodiment described above, the motion control device 30 determines whether or not the distance between the work WK1 and the TCP of the end effector EE measured by the distance measurement section Sd falls outside the preset reference range Ra in the step S320 of FIG. 4. However, it is also possible to adopt an embodiment in which the motion control device 30 determines whether or not the rate of change of the distance between the work WK1 and the TCP of the end effector EE measured by the distance measurement section Sd falls outside a preset reference range of the rate of change. The reference range of the rate of change can be −0.8 mm/s to +0.8 mm/s.

The "first setting" according to such an embodiment, when the end effector EE is being moved by the arm Am based on an output from the distance measurement section Sd, the motion control device 30 stops moving the end effector EE when the rate of change of the distance measured by the distance measurement section Sd falls outside the reference rage.

Further, in the "second setting" according to such an embodiment, when the end effector EE is being moved by the arm Am based on an output from the distance measurement section Sd, the motion control device 30 continues to move the end effector EE not based on an output from the distance measurement section Sd when the rate of change of the distance measured by the distance measurement section Sd falls outside the reference range. More specifically, the motion control device 30 moves the end effector EE toward the next target position that is not yet passed through among the target positions in the work being executed.

By adopting such an aspect, it is possible to perform a highly responsive position control, compared with an aspect in which the determination based on the distance is performed.

(9) In the third embodiment described above, when the diverging distance between the ideal trajectory of the TCP and the actual trajectory of the TCP is larger than the threshold value ThD in the step S315 of FIG. 12, the processing proceeds to the step S317. As a result, an error message from the output device 58 (refer to FIG. 1) is output. Thereafter, the processing proceeds to the step S320. However, when the diverging distance between the ideal trajectory of the TCP and the actual trajectory of the TCP is larger than the threshold value ThD in the step S315 of FIG. 12, the processing may proceed to the step S330 without going through the steps S317 and 5320. Even in such an aspect, work can be continuously performed in the second setting.

F2. Other Embodiment 2

In the first embodiment described above, when the measured distance falls outside the reference range, the end effector EE is linearly moved toward the next target position TP2 (refer to arrow Aop of FIG. 7). Further, in the second embodiment described above, when the measured distance falls outside the reference range, the end effector EE is moved while the end effector EE is moved away from, or close to, the work WK2 in addition to the velocity component of the movement up to that time (refer to S354 and S356 of FIG. 9 and FIGS. 11 and 12). However, the embodiment in which the movement when the measured distance falls outside the reference range is continued can be replaced with another embodiment in which the direction and magnitude of the velocity of the movement up to that time are maintained.

F3. Other Embodiment 3

(1) In the first embodiment described above, the motion control device 30 determines whether or not the distance between the work WK and the TCP of the end effector EE falls outside the preset reference ranger Ra in the step S320 of FIG. 4. Then, the motion control device 30 determines whether or not the distance between the work WK1 and the TCP of the end effector EE measured by the distance measurement section Sd falls within the reference range Ra in the step S360 of FIG. 4. Either of these determinations can be performed based on the rate of change of the distance in place of the distance. Further, one determination can be performed based on the distance and the other decision can be performed based on the rate of change of the distance.

(2) In the first embodiment described above, the motion control device 30 determines whether or not the distance between the work WK and the TCP of the end effector EE measured by the distance measurement section Sd falls within the reference range Ra in the step S360 of FIG. 4. However, the processing of the step S360 can be omitted.

F4. Other Embodiment 4

In the first embodiment described above, the motion control device 30 determines whether or not the elapsed time since the distance between the work WK and the TCP of the end effector EE falls outside the reference range Ra exceeds the threshold value time in the step S370 of FIG. 4. The user can set the time threshold value in advance in accordance with the relative moving velocity of the work section in the work of a table and the work and the shape of the work. Further, the time threshold value may be fixedly set in the robot system. It should be noted that the processing of the step S370 can be omitted.

F5. Other Embodiment 5

(1) In the second embodiment described above, the motion control device 30 determines, in the step S352 of FIG. 9, which of the upper limit and the lower limit of the reference range Ra the distance between the work WK and the TCP is close to, immediately before the distance between the work WK and the TCP of the end effector EE falls outside the reference range Ra. However, the determination can be performed based on the rate of change of the distance and the upper limit and the lower limit of the reference range of the rate of change of the distance. Further, the parameter used in the determination of the step S352 may coincide with, or differ from, the steps S320 and S360 of FIG. 4.

(2) In the second embodiment described above, when the distance between the work WK and the TCP is close to the lower limit of the reference range Ra in the step S352, the processing proceeds to the step S354. However, in such a case, the processing of the step S354 may be omitted and the processing may proceed to the step S360

F6. Other Embodiment 6

(1) In the second embodiment described above, when the distance between the work WK and the TCP is close to the upper limit of the reference range Ra, the processing proceeds to the step S356. However, in such a case, the processing of the step S356 may be omitted and the processing may proceed to the step S360.

(2) In the second embodiment described above, the motion control device 30 determines, in the step S352 of FIG. 9, which of the upper limit and the lower limit of the reference range Ra the distance between the work WK and the TCP is close to immediately before the distance between the work WK and the TCP of the end effector EE falls outside the reference range Ra. However, it is also possible to adopt an embodiment in which the processing of FIG. 9 is not performed.

F7. Other Embodiment 7

(1) In the second embodiment described above, the distance by which the TCP is moved away from the work WK in the step S354 of FIG. 9 is equal to or less than the difference between the upper limit value and the lower limit value of the reference range Ra. However, the distance by which the TCP is moved away from the work WK can be another value such as a value equal to, or a value larger than, the difference between the upper limit value and the lower limit value of the reference range. Further, it is also possible to adopt an embodiment in which the velocity component by which the TCP is moved away from the work WK has an upper limit.

(2) In the second embodiment described above, the distance by which the TCP is moved close to the work WK in the step S356 of FIG. 9 is equal to or less than the difference between the upper limit value and the lower limit value of the reference range Ra. However, the distance by which the TCP is moved close to the work WK can be another value such as a value equal to, or a value larger than, the difference between the upper limit value and the lower limit value of the reference range. Further, it is also possible to adopt an embodiment in which the velocity component by which the TCP is moved close to the work WK has an upper limit value.

F8. Other Embodiment 8

In the first embodiment described above, the end effector EE functioning as a work section is a dispenser ejecting the fluid Ps to be adhered to the work WK (refer to FIG. 1). In the fourth embodiment described above, the work section is the dispenser Dp (refer to FIG. 14). However, the work section may be configured to perform other works like a laser processing machine or a brush for applying a fluid, for example.

F9. Other Embodiment 9

In the first embodiment described above, the distance measurement section Sd is fixed to the link L6 of the tip end of the arm Am or the end effector EE (refer to FIG. 1). Further, in the first embodiment described above, the distance measurement section Sd2 is fixed to the dispenser Dp (refer to FIG. 14). However, it is also possible to adopt an embodiment in which the distance measurement section is fixed to a target object such as the work or is configured to measure the distance between the target object and the work section. In the present specification, "A is fixed to B" is not limited to an aspect in which A is directly fixed to B and means that A is in a state in which the relative position with respect to B does not change.

F10. Other Embodiment 10

In the first embodiment described above, in moving from a certain target position to a next target position, the motion control device 30 performs the feedback control of the arm Am based on an output from the distance measurement section Sd so that, the distance between the work WK and the TCP of the end effector EE remains constant (refer to S310 of FIG. 4). However, in moving from a certain target position to a next target position, the motion control device 30 may control the arm without performing the feedback control. That is, the motion control device 30 may control the arm simply based on a command value without using a measurement value.

G. Still Other Embodiment

The present disclosure is not limited to the embodiments described above and can be realized in various forms without departing from the scope thereof. For example, the present disclosure can be realized in the following form. The technical features in the embodiments described above corresponding to the technical features of each of the forms can be replaced or combined as appropriate to solve some or all of the problems according to the present disclosure or to achieve some or all of the effects according to the present disclosure. Further, the technical features are described as indispensable in the present specification but can be removed as appropriate.

(1) According to one embodiment of the present disclosure, a control device controlling a robot having a movable section moving a work section performing work on a target object is provided. The control device includes a control section controlling the movable section to which the work section is attached and a reception section receiving a first setting or a second setting, in which, when the reception section receives the first setting and the work section is being moved by the movable section based on an output from a distance measurement section measuring distance between the target object and the work section, the control section stops moving the work section when the distance or a rate of change of the distance measured by the distance measurement section falls outside a preset reference range and, when the reception section receives the second setting and the work section is being moved by the movable section based on an output from the distance measurement section, the control section moves the work section not based on an output from the distance measurement section when the distance or the rate of change falls outside the reference range.

According to such an aspect, even when irregularities having a sharp inclination in an area to be processed exist, it is possible to continuously perform work in the second setting. As a result, it is possible to efficiently perform work on a target object.

(2) In a control device according to the embodiment described above, it is also possible to adopt an embodiment in which the reception section receives an input of a target position of a control point of the robot and, when the reception section receives the second setting and the work section is being moved by the movable section, the control section moves the work section based on the target position when the distance or the rate of change falls outside the reference range.

According to such an aspect, even when the distance between a target object and the work section or the rate of change thereof falls outside the reference range, it is possible to continue the work initially conceived based on the target position.

(3) In a control device according to the embodiment described above, it is also possible to adopt an embodiment in which, when the reception section receives the second setting and the work section is being moved by the movable section based on an output from the distance measurement section, the control section moves the work section by the movable section based on the output from the distance measurement section when the distance or the rate of change falls within the reference range.

According to such an aspect, even when the target object has irregularities having a sharp inclination in an area to be processed, it is possible to continuously perform a work on the target object while considering the distance between the target object and the work section as much as possible by performing a control based on an output from the distance measurement section and a control not based on an output from the distance measurement section.

(4) In the control device according to the embodiment described above, it is also possible to adopt an embodiment in which, when the reception section receives the second setting and preset time elapses since the distance or the rate of change falls outside the reference range, the control section stops moving the work section.

According to such an aspect, it is possible to reduce the risk of the work section colliding with the target object or other objects by continued movement.

(5) In the control device according to the embodiment described above, it is also possible to adopt an embodiment in which, when the reception section receives the second setting and the distance immediately before the distance falls outside the reference range is closer to the lower limit value than the upper limit value of the reference range, in moving the work section, the control section moves the work section away from the target object.

According to such an aspect, it is possible to reduce the risk of the work section colliding with the target object or other objects.

"Distance measured by the distance measurement section immediately before the distance measured by the distance measurement section falls outside the reference range" is the distance measured by the distance measurement section in the processing immediately before a cycle in which a processing, in which the control device determines whether or not the distance measured by the distance measurement section falls outside the preset reference range, is repeatedly executed.

(6) In the control device according to the embodiment described above, it is also possible to adopt an embodiment in which, when the reception section receives the second setting and the distance immediately before the distance falls outside the reference range is closer to the upper limit value than the lower limit value of the reference range, in moving the work section, the control section moves the work section close to the target object.

According to such an aspect, when the possibility of the distance between the target object and the work section being larger than the reference range is high, it is possible to bring the distance between the target object and the work section close to the conceived distance without relying on the output from the distance measurement section. As a result, it is possible to improve the quality of the result of the continued work.

(7) In the control device according to the embodiment described above, it is also possible to adopt an embodiment in which, when the control section moves the work section away from the target object, the distance by which the work section is moved away from the target object is equal to or less than the difference between the upper limit value and the lower limit value and, when the control section moves the work section close to the target object, the distance by which the work section is moved close to the target object is equal to or less than the difference between the upper limit value and the lower limit value.

According to such an aspect, without relying on the output from the distance measurement section, it is possible to increase the possibility of the distance between the target object and the work section being close to the conceived distance. As a result, it is possible to improve the quality of the result of the continued work.

In moving the work section away from the target object, the control section may not move the work section away from target object by the distance larger than the difference between the upper limit value and the lower value limit. Further, in moving the work section close to the target object, the control section may not move the work section close to the target object by the distance larger than the difference between the upper limit value and the lower limit value.

(8) In the control device according to the embodiment described above, it is also possible to adopt an embodiment in which the work section ejects an ejection material to be ejected onto the target object in the work.

According to such an aspect, when the target object has irregularities having a sharp inclination in the area to be processed, it is possible to continuously perform the work of adhering the fluid to the target object in the second setting.

(9) In the control device according to the embodiment described above, it is also possible to adopt an embodiment in which the distance measurement section is attached to the movable section or the work section.

According to such an aspect, even if the work section is moved by the movable section, the distance measurement section can accurately measure the distance between the target object and the work section.

(10) In the control device according to the embodiment described above, it is also possible to adopt an embodiment in which, in moving the work section based on an output from the distance measurement section, the control section performs the feedback control so that the distance between the target object and the work section remains constant.

According to such an aspect, even when the target object has irregularities having a sharp inclination, which cannot be followed in the feedback control, in the area to be processed, it is possible to perform a work in the second setting.

(11) According to another embodiment of the present disclosure, a control device according to the embodiment described above and the robot controlled by the control device are included and a robot system is provided.

(12) According to still another embodiment of the present disclosure, a control device controlling a robot having a movable section holding a target object on which work is performed by a work section and moving the target object is provided. The control device includes a control section controlling the movable section and a reception section receiving a first setting or a second setting, in which, when the reception section receives the first setting and the target object is being moved by the movable section based on an output from the distance measurement section measuring the distance between the target object and the work section, the control section stops moving the target object when the distance or the rate of change of the distance measured by the distance measurement section falls outside a preset reference range, and, when the reception section receives the second setting and the target object is being moved by the movable section based on an output from the distance measurement section, the control section moves the target objects not based on an output from the distance measurement section.

According to such an aspect, when the target object has irregularities having a sharp inclination in the area to be processed, it is possible to continuously perform work in the second setting. As a result, it is possible to efficiently perform work on the target object.

The present disclosure can also be realized in various forms other than a control device controlling a robot, a robot, a robot system, and a control method of a robot. For example, the present disclosure can be realized in a form such as a computer program realizing a robot manufacturing method or a robot control method, a non-transitory storage medium in which the computer program is stored, or the like.

A plurality of components included in each embodiment of the present disclosure described above are not all indispensable, and, in order to solve some or all of the problems described above and to achieve some or all of the effects described in the present specification, some components of the plurality of components can be changed, removed and replaced with other new components and some limiting contents can be removed as appropriate. Further, in order to solve some or all of the problems described above and to achieve some or all of the effects described in the present specification, some or all of the technical features included in one embodiment according to the present disclosure as described above can be combined with some or all of the technical features included in other embodiments according to the present disclosure or can be embodied independent of the present disclosure.

What is claimed is:

1. A control device controlling a robot having a movable section moving a dispenser that ejects a fluid toward a target object to deposit the fluid on the target object, the device comprising:
    a control section controlling the movable section to which the dispenser is attached; and
    a reception section receiving a first setting or a second setting, wherein
    when the reception section receives the first setting and the dispenser is being moved by the movable section based on an output from a distance measurement section measuring a distance between the target object and the dispenser, the control section stops moving the dispenser when the distance or a rate of a change of the distance measured by the distance measurement section falls outside a preset reference range, and
    when the reception section receives the second setting and the dispenser is being moved by the movable section based on the output from the distance measurement section, the control section moves the dispenser not based on the output from the distance measurement section when the distance or the rate of change falls outside the preset reference range.

2. The control device according to claim 1, wherein the reception section receives an input of a target position of a control point of the robot, and
    when the reception section receives the second setting and the dispenser is being moved by the movable section, the control section moves the dispenser based on the target position when the distance or the rate of change falls outside the preset reference range.

3. The control device according to claim 1, wherein
    when the reception section receives the second setting and the dispenser is being moved by the movable section not based on the output from the distance measurement section, the control section moves the dispenser by the movable section based on the output from the distance measurement section when the distance or the rate of change falls within the preset reference range.

4. The control device according to claim 1, wherein when the reception section receives the second setting and preset time elapses since the distance or the rate of change falls outside the preset reference range, the control section stops moving the dispenser.

5. The control device according to claim 1, wherein
    when the reception section receives the second setting and the distance immediately before the distance falls outside the preset reference range is closer to a lower limit value than an upper limit value of the preset reference range, in moving the dispenser, the control section moves the dispenser away from the target object.

6. The control device according to claim 5, wherein
    when the reception section receives the second setting and the distance immediately before the distance falls outside the preset reference range is closer to the upper limit value than the lower limit value of the preset reference range, in moving the dispenser, the control section moves the dispenser toward the target object.

7. The control device according to claim 6, wherein
    when the control section moves the dispenser away from the target object, the distance by which the dispenser is moved away from the target object is equal to or less than a difference between the upper limit value and the lower limit value, and
    when the control section moves the dispenser toward the target object, the distance by which the dispenser is moved toward the target object is equal to or less than the difference between the upper limit value and the lower limit value.

8. The control device according to claim 1, wherein the distance measurement section is attached to the movable section or the dispenser.

9. The control device according to claim 1, wherein
    in moving the dispenser based on the output from the distance measurement section, the control section performs a feedback control so that the distance between the target object and the dispenser remains constant.

10. A robot system comprising:
    the control device according to claim 1; and
    the robot controlled by the control device.

11. The robot system according to claim 10, wherein the fluid is an adhesive.

12. The control device according to claim 1, wherein the fluid is an adhesive.

13. A control device controlling a robot having a movable section holding a target object, on which a fluid is ejected by a dispenser and the fluid is deposited, and moving the target object, the device comprising:
    a control section controlling the movable section; and
    a reception section receiving a first setting or a second setting, wherein
    when the reception section receives the first setting and the target object is being moved by the movable section based on an output from a distance measurement section measuring a distance between the target object and the the control section stops moving the target object when the distance or a rate of change of the distance measured by the distance measurement section falls outside a preset reference range, and
    when the reception section receives the second setting and the target object is being moved by the movable section based on the output from the distance measurement section, the control section moves the target object not based on the output from the distance measurement section when the distance or the rate of change falls outside the preset reference range.

14. The control device according to claim 13, wherein the fluid is an adhesive.

* * * * *